United States Patent
Rokhlenko et al.

(10) Patent No.: US 10,592,996 B2
(45) Date of Patent: Mar. 17, 2020

(54) RANKING ANSWERS FOR ON-LINE COMMUNITY QUESTIONS

(71) Applicant: Oath Inc., New York, NY (US)

(72) Inventors: Oleg Rokhlenko, Haifa (IL); David Carmel, Haifa (IL); Idan Szpektor, Kfar Saba (IL); Adi Omari, Haifa (IL)

(73) Assignee: Oath Inc., New York, NY (US)

( * ) Notice: Subject to any disclaimer, the term of this patent is extended or adjusted under 35 U.S.C. 154(b) by 406 days.

(21) Appl. No.: 15/170,754

(22) Filed: Jun. 1, 2016

(65) Prior Publication Data

US 2017/0351750 A1 Dec. 7, 2017

(51) Int. Cl.
*G06F 16/00* (2019.01)
*G06Q 50/00* (2012.01)
*G06F 16/9535* (2019.01)

(52) U.S. Cl.
CPC ......... *G06Q 50/01* (2013.01); *G06F 16/9535* (2019.01)

(58) Field of Classification Search
CPC ........... G06F 17/30684; G06F 17/3053; G06F 17/30985; G06F 17/30; G06F 17/30477; G06F 17/30654; G06F 17/30029; G06F 17/30424; G06F 17/30867; G06F 17/30976; G06F 17/30979; G06F 16/9535
USPC ................................................ 707/705–780
See application file for complete search history.

(56) References Cited

U.S. PATENT DOCUMENTS

| 8,010,546 B2* | 8/2011 | Terrill | G06Q 50/01 707/758 |
|---|---|---|---|
| 8,275,769 B1* | 9/2012 | Suh | G06Q 10/101 705/319 |
| 8,346,701 B2* | 1/2013 | Wang | G06F 17/30634 706/46 |
| 2011/0055699 A1* | 3/2011 | Li | G06F 17/30864 715/709 |
| 2014/0330804 A1* | 11/2014 | Bao | G06F 17/30672 707/706 |
| 2014/0351281 A1* | 11/2014 | Tunstall-Pedoe | G06N 5/02 707/760 |
| 2015/0356146 A1* | 12/2015 | Yamashita | G06Q 10/105 707/722 |
| 2016/0170989 A1* | 6/2016 | Bishop | G06F 16/24578 707/723 |
| 2016/0232155 A1* | 8/2016 | Allen | G06F 17/277 |
| 2017/0116250 A1* | 4/2017 | Allen | G06F 16/2365 |
| 2017/0193090 A1* | 7/2017 | Byron | G06F 17/30684 |

OTHER PUBLICATIONS

James Allan, Courtney Wade, and Alvaro Bolivar, "Retrieval and Novelty Detection at the Sentence Level", SIGIR'03, Jul. 28-Aug. 1, 2003, Toronto, Canada, 8 pages.

(Continued)

*Primary Examiner* — Michelle N Owyang
(74) *Attorney, Agent, or Firm* — Cooper Legal Group, LLC

(57) ABSTRACT

Briefly, example methods, apparatuses, and/or articles of manufacture are disclosed that may be implemented, in whole or in part, using one or more computing devices to facilitate and/or support one or more operations and/or techniques for in part, to facilitate and/or support one or more operations and/or techniques for ranking answers for on-line community questions.

21 Claims, 5 Drawing Sheets

(56) References Cited

OTHER PUBLICATIONS

Achananuparp et al, "Answer Diversification for Complex Question Answering on the Web", Lecture Notes in Computer Science, Jun. 21, 2010, 9 pages.
Garbilovich, et al. "Computing Semantic Relatedness using Wikipedia-based Explicit Semantic Analysis", IJCAI'07 Proceedings of the 20th International Joint Conference on Artificial Intelligence, Jan. 6, 2007, 6 pages.
Krestel, et al., "Diversifying Product Review Rankings: Getting the Full Picture", Proc. of 2011 IEEE/WIC/ACM International Conference on Web Intelligence (WI 2011), Lyon, France, Aug. 22-27, 2011, 8 pages.
Santos, et al., "Exploiting Query Reformulations for Web Search Result Diversification", Proceedings of the 19th International Conference on World Wide Web, Apr. 26, 2010, 10 pages.
Wilcoxon, "Individual Comparisons by Ranking Methods", Biometrics Bulletin, vol. 1, No. 6. (Dec. 1945), pp. 80-83.

\* cited by examiner

RANKING ANSWERS FOR ON-LINE COMMUNITY QUESTIONS

BACKGROUND

1. Field

The present disclosure relates generally to on-line content management systems, such as question-answering systems, for example.

2. Information

The Internet is widespread. The World Wide Web or simply the Web, provided by the Internet, is growing rapidly, at least in part, from the large amount of content being added seemingly on a daily basis. A wide variety of content, such as one or more electronic documents, for example, is continually being identified, located, retrieved, accumulated, stored, communicated, etc. In some instances, electronic documents may comprise, for example, questions and/or related answers posted on-line, such as within a community question answering (CQA) web site, as one example. CQA or like web sites, such as Yahoo!® Answers, Baidu™ Zhidao, Answers.com™, Stack Overflow™, or the like, in which users may post questions and/or answers, have become a useful tool for on-line inquiries that, at times, may not be answered by searching and/or viewing general web pages. At times, on-line answers may be returned within a listing of general search results, such as in response to web search queries, for example, and, as such, may be viewed not only by asking users, but also by thousands, millions, etc. of other searchers. Thus, effectively and/or efficiently identifying and/or locating answers of interest may facilitate and/or support information-seeking behavior of on-line users, in the context of CQA or otherwise, and may lead to an increased usability of a search engine.

In addition to locating, retrieving, identifying, etc. electronic documents, such as answers of interest, for example, search engines may employ one or more functions and/or processes to rank retrieved documents using one or more ranking measures and/or approaches. Typical ranking measures and/or approaches tend to focus on determining whether a particular answer should be selected as a best or more appropriate answer, such as by accounting for qualitative aspects of candidate answers separately, for example, in light of their relevance to a corresponding question. At times, these or like ranking measures and/or approaches, however, may fail to consider one or more complementary suggestions and/or aspects provided by different answers, for example. In some instances, typical ranking measures and/or approaches may also fail to address an overall quality of a ranked list of answers. Greater flexibility and/or variety of other ranking measures and/or approaches, such as those that may account for novel and/or diverse aspects of answers, for example, while maintaining and/or improving their importance and/or relevance to corresponding questions may, therefore, be desirable.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
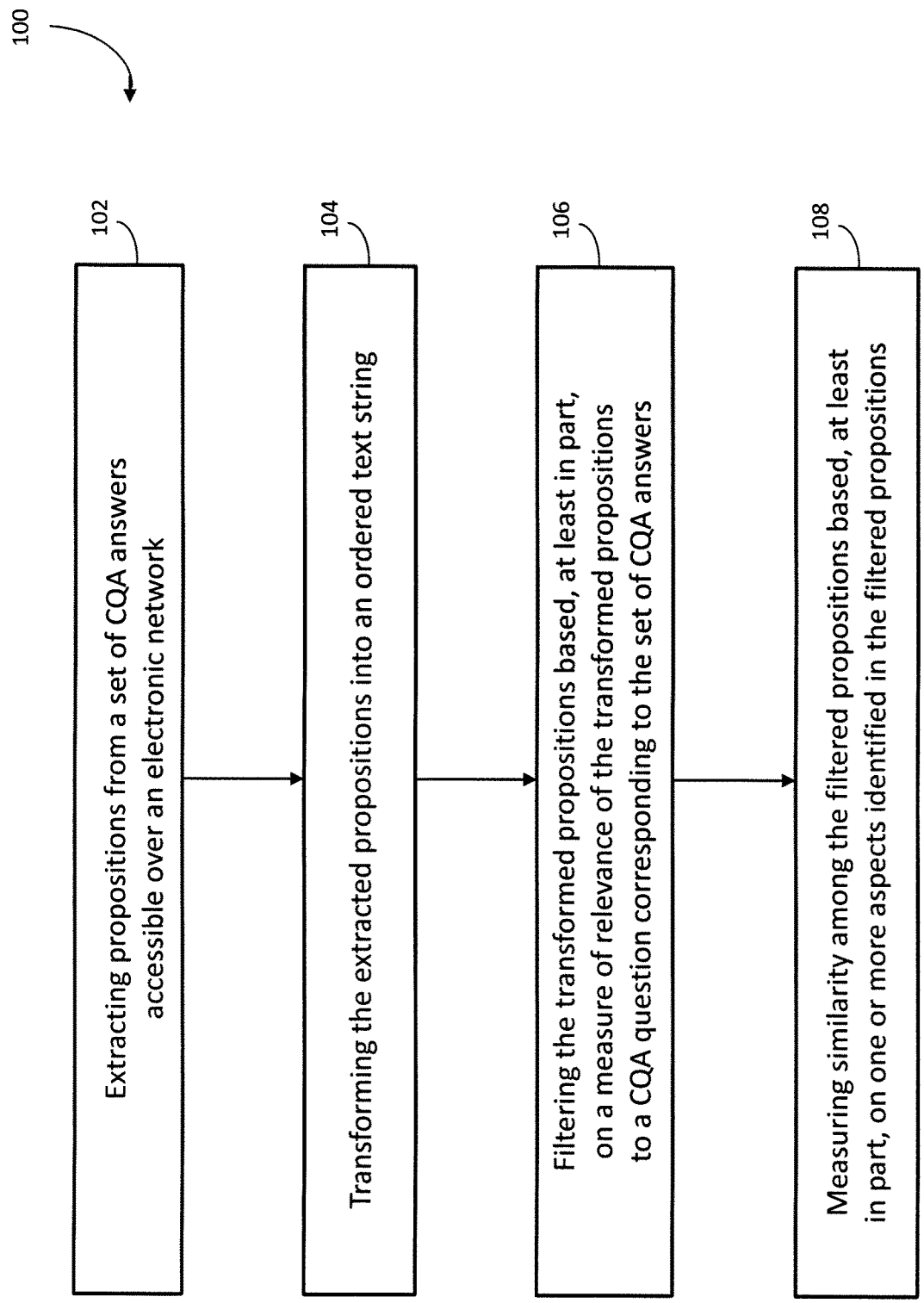
FIG. 1 is a flow diagram illustrating an implementation of a process for ranking answers for on-line community questions.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for ranking answers for on-line community questions, such as implemented in connection with one or more computing and/or communication networks and/or protocols (e.g., network protocols) discussed herein, for example. As was indicated, at times, answers for on-line community questions may, for example, be ranked, at least in part, in connection with an on-line content management system, such as a search engine, as one possible example, so as to improve a quality of a returned list of answers, among other things. In some instances, an on-line content management system, such as a question-answering system may comprise a search engine, such as in the form of a content retrieval computing platform, for example, that may help an on-line user to locate and/or retrieve on-line content, such as one or more web documents of a particular interest.

As used herein, "on-line" refers to a type of a communication that may be implemented electronically, such as via one or more suitable communications networks (e.g., wireless, wired, etc.), for example. "Content," as the term used herein, should be interpreted broadly and refers to signals, such signal packets, for example, and/or states, such as physical states on a memory device, for example, but otherwise is employed in a manner irrespective of format, such as any expression, realization, and/or communication, for example. Content may comprise, for example, any information, knowledge, and/or experience, such as, again, in the form of signals and/or states, physical or otherwise. In this context, "electronic" or "on-line content" refers to content in a form that although not necessarily capable of being perceived by a human, (e.g., via human senses, etc.) may nonetheless be transformed into a form capable of being so perceived, such as visually and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, web page, or the like. Claimed subject matter is not intended to be limited to these examples, of course.

The terms "web document" or "electronic document" may be used interchangeably herein and refer to one or more digital signals, such as communicated and/or stored signals, for example, representing any content including a source code, text, image, audio, video file, or the like. Web documents may, for example, be processed by a special purpose computing device and may be played and/or displayed to or by a user and/or client. A particular example of a special purpose computing device will be discussed in greater detail in connection with FIG. 5. The terms like "user" or "client" may also be used interchangeably herein. At times, web documents may include one or more embedded references or hyperlinks to images, audio and/or video files, or other web documents. For example, one common type of reference may comprise a Uniform Resource Locator (URL). As a way of illustration, web documents may include a web page, news feed, rating and/or review post, question, answer, status update, portal, blog, e-mail, text message, hyperlink, Extensible Markup Language (XML) document, media file, web page pointed and/or referred to by a URL, etc., just to name a few examples.

As alluded to previously, Community Question Answering (CQA) may comprise a social-type portal and/or service in which on-line users may, for example, post and/or view CQA questions and/or answers. Thus, CQA has become a useful tool for inquiries that, at times, may not be answered by browsing the Web and/or viewing more general web pages. At times, answers for CQA questions may, for example, be returned as and/or among top links in a listing of more general search results and, as such, may be viewed not only by users posting or asking a particular question within a particular CQA web site, but also by thousands, millions, etc. of search engine users. Depending on a topic, a number of answers for a CQA question may range from a handful to dozens, for example, and a user posting a CQA question may typically be interested in a variety of suggestions provided in corresponding answers. In general, it may be understood that questions and/or answers intended to be referenced in a particular discussion refer to CQA questions and/or answers, such as accessible over an electronic network, for example, although in the particular context, the terms "questions" and "answers" may be employed for ease of discussion For certain types of questions, such as factoids, for example, on-line users may typically, although not necessarily, be prone or inclined to read a fewer number of higher-quality answers. For other types of questions, such as those eliciting an opinion and/or asking for a recommendation, for example, users may benefit from a variety of different views and/or suggestions. In some instances, however, users may not want to sift through all or most answers (e.g., going beyond a first, second, etc. search results page), but may opt for reading a handful of top results instead. As was indicated, typical approaches for answer ranking, in CQA settings or otherwise, primarily address qualitative notions of a particular answer separately, as well as its relevance to a question, and/or whether it should be marked as best or more suitable answer. These or like approaches, however, may fail to consider an overall quality of a ranked answer list and/or complementary suggestions, such as via embedded aspects, for example, that may be contained in a variety of different answers. In this context, "aspect" refers to a subtopic indicative of a particular specific fact or detail within a particular CQA answer. For example, for the question "What will help me sleep better?", the answer "Hiya, Poor you, I feel for you, I have trouble sleeping most of the time. OTC you can buy Kalms and all sorts of tablets to help you get to sleep or if you visit a health store, you can buy a herb called valerian that may help you. Other than that try a warm bath with lavender before you go to be and maybe a pillow spray will help. Warm milk and bananas are said to induce sleep too. Good luck honey :-)" contains the following aspects: sleeping pills, herbs, taking a bath, pillow spray, drinks and foods. As another example, for the question "What's your best migraine cure?", the answer "My doctor prescribed pain medication, then I drink a cup of hot coffee or tea. The heat dissolves the pill faster and the caffeine boosts the effects better. Then all I can do is try to sleep. I know what you are going thru, mine are so severe they last for days and the vomiting gets so bad I actually get dehydrated. Like everyone else a dark room and total quiet. Hope this helps you out" contains the following aspects: pain medication, caffeine drinks, dark environment, quiet environment. Of course, these are merely example questions, answers, and/or aspects, and claimed subject matter is not so limited.

To address these or like issues, in some instances, various approaches, such as implemented in connection with content or information retrieval (IR), for example, may be employed. Unlike IR or like settings, however, in which a smaller number of web documents may be relevant to a search query, such as out of a larger number of matching documents, for example, in CQA or like settings, most or all documents (e.g., answers, etc.) may be relevant to a search query (e.g., a question, etc.) to some extent, since CQA answers are provided by users in response to specific questions. As a result, IR or like approaches, such as incorporating novelty detection in addition to relevance estimation (e.g., via the Maximal Marginal Relevance (MMR) criterion, etc.) may, for example, be less than sufficient and/or unfit for ranking content (e.g., answers, etc.) in CQA or like settings. In addition, CQA answers are typically, although not necessarily, much shorter and/or less structured than typical web documents, and, as such, more condensed and/or concise in terms of content they may provide. For example, typical on-line content, such as news articles, as one example, are rather longer, in a proper grammatical form, and/or more structured. This may be different from CQA or like content, such as CQA questions and/or answers, for example, which may be shorter, more ambiguous, with a number of connecting unstructured sentences, etc. Further, as discussed below, in CQA or like settings, question terms, which express inquiries, for example, often may not appear in corresponding answers, which express solutions. As such, at times, it may be difficult to successfully and/or sufficiently identify a number of query aspects using IR or like approaches, which may utilize surface terms instead of topics as indications of aspects, for example.

Also, many aspects in CQA answers may be clamped or merged together in a single sentence, which may, for example, make a typical approach of looking at a sentence as an atomic text unit less than useful. As a way of illustration, consider, for example, the question "What's your best migraine cure? I have the worst headache . . . " and the provided answers "Excedrine migraine, phenergan, dark room, cold compress, 8 hours of sleep", and "Take medicine, go in a dark room and sleep for at least an hour, it helps to use earplugs." As seen, here, an answer may include a number of complementary suggestions, such as via embedded aspects, such as, for example, sleeping, being in a dark room, medicine taking, etc., which may be difficult to identify at a coarser-grained sentence level typically employed by IR or like approaches. In addition, typical IR or like approaches may not account for so-called "wisdom of the crowd" approach, meaning that a suitable or sufficient weight may not be given to one or more aspects that may be repeated in a variety of different answers (e.g., recommendations, solutions, etc.), for example, and, as such, may be viewed as more important than others. Accordingly, it may be desirable to develop one or more methods, systems, and/or apparatuses that may facilitate and/or support more effective and/or more efficient ranking of content in CQA or like settings, for example, such as via accounting for its relevance, amount of aspects it may cover (e.g., diversity), and/or amount of new aspects it may introduce with respect to one or more higher ranked answers (e.g., novelty).

Thus, as will be described in greater detail below, in an implementation, a number of propositions, defined below, identified in CQA answers posted on-line may, for example, be extracted and transformed into an ordered text string, such as for further processing. Transformed propositions may, for example, be filtered based, at least in part, on a measure of relevance to a corresponding CQA question, such as to eliminate or discard one or more irrelevant propositions. Similarity among filtered propositions may, for example, be measured and used, at least in part, to measure diversity and/or novelty of corresponding aspects. In addition, importance of filtered propositions may also be assessed, such as based, at least in part, on their occurrences in a variety of different CQA answers, for example. Top CQA answers may, for example, be subsequently ranked, such as utilizing a greedy process, as one possible example, that may account for their relevance to a corresponding question, as well as their novelty and/or coverage of important aspects, as will be seen. By way of example, an approach or algorithm suitable for implementing ranking of CQA questions may include an example illustrated in Table 1 below. Thus, consider:

TABLE 1

Example algorithm for ranking CQA answers.

Input: question q
Input: set of answers A
OrderedAnswers = [ ]
foreach a ∈ A do
    AllPropositions[a] = getRelevantPropositions(a, q)
    foreach p ∈ AllPropositions[a] do
        Uncovered[p] = 1
    end
end
while A ≠ ∅ do
    bestAnswer = select(A, Uncovered, AllPropositions)
    OrderedAnswers.Add(bestAnswer)
    A = A \ {bestAnswer}
end
return OrderedAnswers FIG. 1 is a flow diagram illustrating an implementation of an example process 100 that may be performed, in whole or in part, to facilitate and/or support one or more operations and/or techniques for ranking answers for CQA or on-line community questions. As was indicated, at times, example process 100 may be implemented, at least in part, in connection with an on-line content management system, such as a search engine, for example, which may improve a quality of ranked content in CQA or like settings. It should be noted that content acquired and/or produced, such as, for example, input signals, output signals, operations, results, etc. associated with example process 100 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 100 may, for example, begin at operation 102 with extracting propositions from a set of CQA answers accessible over an electronic network, such as a computing and/or communications network, as discussed herein. "Proposition" or "syntactic proposition," as the terms used herein, may be used interchangeably and refer to a basic text unit that conveys a semantically coherent meaning covering a particular aspect within a given answer. For example, as was indicated, unlike a typical view of sentences as basic units in IR as well as multi-document summarization (MDS) or like approaches, in certain simulations and/or experiments, it has been observed that on-line users answering CQA questions may include or combine a number of aspects in a single answer. As a way of illustration, some examples of CQA answers, such as combining a number of aspects, for example, may include those shown in Table 2 below.

TABLE 2

Example CQA answers.

Excedrine migraine, phenergan, dark room, cold compress, 8 hours of sleep
Claratin and zyrtec did nothing for be then my allergist prescribed singular and it worked like a charm
try to get at least 7.5 hrs of sleep and regular exercise
Id drink green tea as late as 10 pm at night but end up staying up really late, its a personal choice, you could always try a sleep aid.

As a way of illustration, the above example question "What's your best migraine cure? I have the worst headache . . . ," the provided answer "Take medicine, go in a dark room and sleep for at least an hour, it helps to use earplugs," may, for example, be considered as comprising the following syntactic propositions: "Take medicine", "go in a dark room and sleep for at least an hour," and "it helps to use earplugs." Of course, CQA answers, questions, and/or propositions are illustrated herein as merely examples to which claimed subject matter is not limited. Thus, since, at times, CQA answers may comprise, for example, a combination of different aspects, here, it may be useful to focus on extracting (and/or utilizing) propositions, such as instead of sentences, for example, as basic semantic units.

Thus, according to an implementation, an applicable sentence, such as a particular CQA answer, for example, may be syntactically analyzed and/or parsed, such as via an appropriate parser and/or process. For example, here, a dependency-type parser, such as ClearParser, accessible at code.google.com/archive/p/clearparser, as one possible example, Clear NLP parser, accessible at code.google.com/archive/p/clearnlp, as another possible example, MaltParser, accessible at maltparser.org, as yet another possible example, or the like may be used, at least in part, or otherwise considered. Words in a sentence (e.g., as part of a CQA answer, etc.) may, for example, be mapped onto a directed graph representation or so-called "dependency tree," in which words may comprise nodes, and grammatical relations may comprise labeled edges.

In an implementation, a dependency tree may, for example, be split into a number of sub-trees based, at least in part, on specific edge types indicative of proposition boundaries. Here, for edge types that may indicate proposition boundaries, the following connectives may, for example, be used, at least in part: CCOMP (clausal complement), NPADVMOD (noun phrase as adverbial modifier), and/or CONJ (conjunct). For purposes of explanation, CCOMP is a connective for a clausal complement of a verb or adjective that is a dependent clause with an internal subject, which functions like an object of a verb, or adjective. NPADVMOD is a connective that captures various places where something syntactically a noun phrase (NP) is used as an adverbial modifier in a sentence. CONJ is a connective between two elements connected by a coordinating conjunction, such as "and", "or", etc. These or like connectives are generally known and need not be described here in greater detail.

At operation 104, extracted propositions, such as in the form of sub-trees, as one example, may be transformed into an ordered text string. For example, in at least one implementation, extracted propositions may be transformed into a text string via ordering nodes in a sub-tree (e.g., words in a sentence, etc.) according to their original position in a given CQA answer. As a way of illustration, using the example answer "Id drink green tea as late as 10 pm at night but end up staying up really late, its a personal choice, you could always try a sleep aid" of Table 1 above, the extracted propositions may be transformed into the following text string: "Id drink green tea as late as 10 pm at night," "end up staying up really late," "it's a personal choice," and "you could always try a sleep aid." Of course, claimed subject matter is not limited to propositions and/or text string shown. It should be noted that, depending on an implementation, operation 104 may or may not be separate from operation 102.

With regard to operation 106, transformed propositions may, for example, be filtered based, at least in part, on a measure of relevance of the transformed propositions to a CQA question corresponding to the set of CQA answers. As was indicated, likewise, a CQA question, such as posted on-line by a user of a CQA or like web site, for example, may be accessible over an electronic network, as discussed herein. In some instances, proposition filtering may, for example, be implemented to ensure that CQA answers may not be promoted and/or selected as candidates for ranking due, at least in part, to one or more irrelevant propositions contained in these answers. As was also discussed, since CQA answers are provided by users in response to specific CQA questions, most or all CQA answers may, for example, be considered as being relevant to a corresponding question to some extent. In certain simulations and/or experiments, it has been observed, however, that, at times, some parts of a CQA answer may not be relevant to a question, such as an emotional response (e.g., "I am sorry to hear that Joe," etc.), connecting sentence (e.g., "but let me tell you how things should really work," etc.), personal agenda (e.g., "we should blame the president for such situations," etc.), emphatic statement (e.g., "it's a personal choice," etc.) or the like.

Thus, in some instances, such as to retain and/or account for propositions more relevant to a question and/or to filter out less relevant propositions (e.g., recurring emphatic statements, etc.), for example, extracted propositions may be ranked based, at least in part, on their similarity to a corresponding question. As was indicated, here, a surface word comparison may not be sufficient and/or useful approach since a language of a CQA question (e.g., expressing a need for a solution, etc.) may differ from a language of a corresponding answer (e.g., conveying a solution to such a need, etc.). As a way of illustration, the question like "What should I see in Paris?" and a corresponding answer like "The Eiffel tower is a must" have no shared terms, but the answer may be considered as relevant. In addition, as has also been observed, typically, although not necessarily, propositions are relatively short texts or writings, while certain CQA questions may be verbose, relatively long, contain several sentences, or the like. Therefore, in CQA or like settings, typical surface level similarity measures, such as Jaccard, Dice, etc., to name a few examples, may not be useful for identifying relevant propositions. These or like surface level similarity measures are generally known and need not be described herein in greater detail.

Thus, according to an implementation, these or like issues may, for example, be addressed by mapping a question and a corresponding answer to a shared latent space and measuring their similarity, such as via a dot product between normalizations of two corresponding vectors, as one possible example. Here, a semantic relatedness-type approach may be employed, at least in part, which may include, for example, a variant of Explicit Semantic Analysis (ESA). For purposes of explanation, in ESA, a meaning of texts in a high-dimensional space of concepts may be derived from knowledge repositories containing human-described concepts and providing their meanings and/or definitions, such as Wikipedia®, for example. Here, a meaning of a text may, for example, be explicitly represented as a weighted vector of Wikipedia® concepts of interest using one or more appropriate machine learning techniques (e.g., support vector machine (SVM), etc.).

As such, relatedness of texts in a shared latent space may be assessed, for example, via a comparison of corresponding vectors, such as using one or more appropriate metrics (e.g., cosine, etc.). More specifically, a text may, for example, be mapped to a semantic space in which a dimension may comprise a Wikipedia® page (e.g., a concept, etc.). This may be implemented via retrieving most relevant or otherwise suitable Wikipedia® documents via inputting a whole text as a search query using an appropriate search engine, for example. Once vectors containing top results for two compared texts are retrieved, a measure of similarity, such as cosine similarity between these two vectors, as one possible example, may be computed to measure their similarity. See, as an example, E. Gabrilovich and S. Markovitch. *Computing semantic relatedness using Wikipedia-based explicit semantic analysis*. In IJCAI, 2007. Of course, claimed subject matter is not intended to be limited to a particular approach.

As was indicated, even though ESA may be sufficiently utilized, at least in part, for computing relatedness for texts, for example, at times, standard ESA may not be capable of compensating for a difference in languages between related content in CQA or like settings, such as CQA questions and corresponding answers. To address this or like issues, in at least one implementation, a variant of ESA, denoted as CQA-ESA, in which a latent space may be defined over a collection of structured documents comprising CQA questions and their best or more suitable answers, such as instead of Wikipedia® documents, for example, may be employed. Here, a CQA document may comprise a dimension, for example, and a representation of a text may be implemented by retrieving top documents in a collection. In CQA-ESA, while representing questions, documents may be retrieved by searching using a question field of a document, for example, and, if CQA answers are provided as queries, documents may be retrieved by searching using an answer field of a document. As such, here, a more proper language may, for example, be used for searching for a type of text, but a final latent space is shared, such as via document IDs. It may be noted that an underlying assumption of this approach is that a best or more suitable answer of a question mat be typically highly relevant to it, and therefore two fields of a single document may convey the same or similar semantics in different "languages."

Thus, as was indicated, to retain and/or account for more relevant propositions, propositions in corresponding answers may, for example, be ranked, such as using CQA-ESA, just to illustrate one possible implementation. By way of example but not limitation, in a particular simulation and/or experiment, it appeared that keeping top 90% propositions similar to a question as relevant and filtering out the rest may prove beneficial for identifying more relevant propositions and/or filtering out less relevant propositions. Of course, details relating to proposition filtering are merely examples to which claimed subject matter is not limited. By way of example but not limitation, in certain simulations and/or experiments, for document collection, a random sample of 2.0 million questions and their best or more suitable answers from Yahoo® Answers may be used. With respect to searching over a document collection, the Apache Lucene™ search engine, accessible at lucene.apache.org, may be used, at least in part, such as under its default settings, though claimed subject matter is not so limited.

At operation 108, similarity among the filtered propositions may, for example, be measured based, at least in part, on one or more aspects identified in said filtered propositions. For example, in some instances, similarity among the filtered propositions may be measured via determining whether propositions represent similar or different aspects, such as via measuring a relationship between relevant propositions, namely, within the same CQA answer and between different answers to the same CQA question. As was indicated, it may be useful to determine which relevant propositions contain different aspects that appear in CQA answers, such as in order to promote and/or select answers with a more diverse set of aspects, for example. In addition, as was also indicated, it may also be useful to promote answers that include one or more aspects that are shared with other answers, as a measure of importance, for example, such as similarly to a notion of the "wisdom of the crowd" discussed above. In some instances, measured similarity among filtered propositions may, for example, be considered or serve as a proxy-type measure of their "diversity" and/or "importance," such as in terms of so-called aspect "support," meaning that the more similar a proposition is to a number of propositions in other answers, the more support it may have. Particular examples of proposition support will be discussed in greater detail below. In this context, "diversity" of propositions refers to an amount of relevant aspects propositions cover in a particular CQA answer. "Importance" of a proposition, as the term used herein, refers to an amount of occurrences of aspects covered by this proposition in other propositions, such as those associated with different CQA answers.

For example, in at least one implementation, whether two propositions refer to similar aspects (or different aspects) may be measured via modeling or processing a set of aspects, such as a number of Wikipedia® articles in which a particular article serves as an aspect, as one possible example, and mapping a particular proposition to elements in this set. Here, a percentage of shared aspects may, for example, serve as a measurement regarding whether two particular propositions refer to different aspects (or not). In another example implementation, whether two propositions refer to similar aspects (or different aspects) may, for example, be measured using, at least in part, semantic similarity $sim(p; o)$ between proposition texts, such as instead of modeling and/or identifying aspects within a particular proposition, for example. Here, a number of similarity measures, such as unsupervised similarity measures listed below, for example, may be employed, in whole or in part. Thus, consider:

Term frequency-inverse document frequency (TF-IDF). A cosine between TF-IDF vectors of two propositions, such as after stop-word removal and stemming, for example. Term frequency of a term is its number of occurrences in a proposition. This measure is a typical surface-word similarity measure that is generally known and need not be described here in greater detail. See, e.g., J. Allan, C. Wade, and A. Bolivar. *Retrieval and novelty detection at the sentence level*. In SIGIR, 2003. In certain simulations and/or experiments, document frequency of a term may, for example, be counted over a collection of randomly sampled 16.0 million questions and their best or suitable answers from Yahoo!® Answers.

Word Embedding. Since, typically, although not necessarily, propositions are relatively short texts, and since on-line users tend to use different wordings to convey the same or similar meanings, at times, word embedding may, for example, be useful in addressing and/or overcoming differences in word selection. Word embedding measure may, for example, employ a process or model that may map words to a low dimensional space, such that semantically similar words may be positioned closer to each other, for example. Here, any suitable trained process or model may be utilized, in whole or in part. For example, in some instances, a process or model trained using the Word2Vec algorithm or process on part of Google® news data-set (e.g., about 100.0 billion words), accessible at tiny.cc/GoogleNews-vectors, may be used, in whole or in part, to map words to a 500 dimension space. In at least one implementation, the following relation or function may, for example, be employed to compute proposition similarity sim(p; o):

$$\text{Coverage}(p, o) = \frac{1}{|p|} \sum_{t_p \in p} \max_{t_o \in o} [\text{cosine}(w2v(t_p), w2v(t_o))] \quad (1)$$

$$sim(p, o) = \sqrt{\text{Coverage}(p, o) \cdot \text{Coverage}(o, p)}$$

where p and o denote propositions; $t_p$ and $t_o$ denote terms in p and o, respectively; and w2v(t) denotes a Word2Vec representation of term t.

Explicit Semantic Analysis (ESA). As discussed above, ESA may be used, at least in part, as a measure of semantic proposition similarly, such as beyond surface wording. Thus, in certain simulations and/or experiments, a proposition may, for example, be represented with its ESA vector over a Wikipedia® dump or like on-line content output over an applicable time period, such as using Lucene™ as a search engine, as was also discussed. Here, a cosine between two vectors may be taken as their similarity measure, for example.

CQA-ESA. As was also discussed above, similarly to ESA similarity measure, a CQA-ESA representation of a proposition may, for example, be used, at least in part, or otherwise considered, such as for purposes of computation of a cosine between two CQA-ESA vectors.

In certain simulations and/or experiments, it has been observed that performance of applicable similarity measures may differ from one question to another and may depend, at least in part, on question particularities. Accordingly, in some instances, such as to introduce and/or improve consistency with respect to a similarity process or function, for example, applicable similarity measures may be combined in a supervised way. More specifically, a classifier or like process may, for example, be trained on a training dataset so as to predict whether two propositions represent the same or similar answer-related aspect for a given question, where input features of a proposition pair may include one or more unsupervised measures described above. In some instances, all four unsupervised measures may, for example, be used. Claimed subject matter is not so limited, of course.

According to an implementation, a training dataset for training a classifier or like process may comprise, for example, a number of pairs of propositions together with corresponding labels indicating whether these propositions capture the same or similar aspect. More specifically, in certain simulations and/or experiments, a dataset comprising, for example, a random sample of 50 questions from the "Health" category in Yahoo!® Answers, each with at least 10 answers, may be used. For a sampled question, an answer may be manually split into propositions, for example, and those irrelevant to the question may be annotated. Relevant propositions in these answers may be further split into a number of clusters, for example, such that a cluster may represent a specific aspect mentioned in the answers. These clusters may, for example, map an aspect for a particular question and may be referred herein as "gold-standard" clusters. Based, at least in part, on "gold standard" clusters (as well as proposition annotations), "importance" of one or more identified aspects may, for example, be represented via a size of its corresponding cluster. In addition, aspect distribution in an answer may, for example, be straightforwardly induced, such as using one or more appropriate techniques. As was indicated, training datasets may, for example, be used, at least in part, to train a classifier or like process for a supervised similarity function discussed above. Here, in some instances, support vector machine (SVM)-type implementation in Weka, a collection of visualization tools and/or approaches for content analysis and/or predictive modeling developed by the Waikato Environment for Knowledge Analysis (Weka), accessible at www.cs.waikato.ac.nz/ml/weka, may, for example, be employed, in whole or in part. At times, classifier's normalized output between [0; 1] may, for example, be employed as a final similarity score. Of course, claimed subject matter is not so limited.

Further, in an implementation, for a given CQA question, a corresponding set of answers may, for example, be ranked based, at least in part, on proposition similarity and/or support, which, at times, may serve as proxies to proposition diversity and/or importance. Here, a greedy-type process or algorithm may, for example, be used, at least in part, or otherwise considered. For example, at times, a greedy-type process may iteratively select the next answer to be added to a ranked list, such as denoted by select( ) in Table 2 above, as one example, by considering how many diverse aspects, important aspects, and/or novel aspects that did not appear in higher ranked answers are included in a particular CQA answer. An iterative process may, for example, continue selecting and/or adding answers to a ranked list so as to generate a complete or otherwise sufficient ordering of CQA answers. To select the next answer given a list of candidate answers and/or higher ranked answers, a similarity-type answer selection approach and/or a hierarchical clustering-type answer selection approach, discussed below, may, for example, be used, in whole or in part, or otherwise considered, such as depending on an implementation. Claimed subject matter is not limited to a particular approach, of course.

Similarity-Type Answer Selection.

Thus, in at least one implementation, a similarity measure or function, such as between propositions may, for example, be employed for answer selection. An answer's score may, for example, be proportional to an amount of "uncovered" propositions that may be similar to relevant propositions of this particular answer. Formally, a particular proposition's novelty assessment may, for example, be maintained in an Uncovered[p] property, such as according to how much an aspect it represents is already presented by other propositions in higher ranked answers. Thus, Include(p; a) may, for example, be defined, such as via measuring how well answer a includes content given in proposition p, based, at least in part, on p's similarity to such answer's propositions $p_a$. A score of a candidate answer may then be promoted, such as by summing an inclusion of all or most propositions related to a, weighted by their novelty property, for example. Thus, consider, for example:

$$\text{Include}(p, a) = 1 - \prod_{p_a \in a} (1 - sim(p, p_a)) \quad (2)$$

$$s(a) = \sum_{p \in \text{AllPropositions}} \text{Uncovered}[p] \cdot \text{Include}(p, a)$$

It should be noted that, in some instances, Include(p; a) may act or function as a "noisy-or" formulation of similarity, for example, in which answer proposition $p_a$ is similar to p, such as to indicate that a particular answer may include content in p. Once a highest or higher scoring answer bestAnswer is selected, an Uncovered assessment of a proposition may be recomputed as, for example:

$$\forall_{p \in \text{AllPropositions}} \text{Uncovered}[p] = \text{Uncovered}[p] \cdot (1 - \text{Include}(p, \text{bestAnswer})) \quad (3)$$

In some instances, it may be useful to consider that during a re-computation phase, an Uncovered[$p_{ba}$] property of a proposition $p_{ba} \in$ bestAnswer becomes 0, since Include($p_{ba}$; bestAnswer)=1. At times, these propositions may no longer contribute to a score of lower ranked answers, such as in future iterations, for example. Therefore, a scoring formulation s(a) may consider one or more propositions in one or more unranked answers, such as for contribution to an answer's score, for example.

It may also be useful to consider that, at times, a scoring formulation s(a) may include a notion of proposition importance since an important proposition in a CQA answer may be expected to be similar to a number of propositions capturing the same or similar aspect and, as such, may increase one or more Include(p; a) values for those propositions. Hence, in some instances, an answer with novel supported propositions may receive a higher s(a) score than another answer with the same number of novel propositions, but corresponding to one or more uncommon aspects.

It should be noted that, at times, a similarity-type answer selection approach may advantageously downgrade importance of less desirable aspects, such as those already covered by higher ranking documents, for example. Unlike typical IR or like approaches, in which aspects may comprise sub-queries and/or variations or expansions of an original query, and in which a notion of coverage may be typically measured between a query and a document. Here, aspects may comprise propositions, such as extracted from CQA answers, for example. As such, they may be of a different language than a corresponding question, for example, and a notion of coverage may be based, at least in part, on proposition similarity rather than typical IR or like similarity measures, such as BM25, or the like.

Hierarchical Clustering-Type Answer Selection.

In certain simulations and/or experiments, it has been observed that, at times, to facilitate and/or support CQA answer selection, it may be useful to generate and/or obtain a number of clusters of propositions, such that a particular cluster may reflect a particular specific aspect within CQA answers, for example. A size of clusters may, for example, indicate "support" of a particular aspect, discussed above, and "diversity" of a particular CQA answer may, for example, be derived, at least in part, from a number of its related clusters (e.g., aspects, etc.).

Accordingly, in an implementation, for answer selection and/or ranking, an agglomerative hierarchical clustering tree of a set of propositions may, for example, be generated or constructed. More specifically, in some instances, the Cluto tool, accessible at glaros.dtc.umn.edu/gkhome/software, may, for example, be employed, at least in part, so as to construct a hierarchical cluster tree based, at least in part, on a similarity matrix between propositions, such as in connection with a similarity measure or function discussed above. A resulting cluster tree structure may, for example, be used, at least in part, to calculate support of a particular proposition and to penalize propositions that may be similar to propositions in already selected CQA answers. An answer score formulation s(a) of this approach may be defined as, for example:

$$s(a) = \frac{\sum_{p \in a} \text{Uncovered}[p] \cdot \text{Depth}(p, T)}{\sqrt{|a|} \cdot \left(1 + \left(1 - \frac{\sum_{p \in a} \text{Uncovered}[p]}{|a|}\right)\right)} \quad (4)$$

where |a| denotes a number of propositions in a.

It may be useful to note that one or more propositions that may be further down a tree (note that Depth(p; T) denotes a distance of node p from a root of a cluster tree, which, at times, may be unbalanced) may be considered as being more supported, for example, since they may be more similar to a number of other propositions, and, as such, a nominal part may capture an average support of an answer. It may also be useful to note that a CQA answer with more extensively covered propositions, such as propositions that may not be considered novel, for example, may be penalized since it may have a larger denominator. Therefore, in some instances, Relation 4 may, for example, be capable of weighing novelty and support against each other.

Continuing with the above discussion, having selected an answer a, such as for inclusion into a ranked list, for example, one or more propositions that may be more similar to one or more propositions on such a list may be penalized in some manner. For example, in an implementation, propositions may be penalized according to their distance from selected answer propositions in a cluster tree, meaning that the further away propositions are, the less they may be penalized. More specifically, for a proposition $p_a$ in a selected CQA answer, a process may begin from a corresponding leaf node in a tree, for example, and may climb towards a tree root. At each node n, a process may penalize propositions in which n is their nearest common ancestor with $p_a$, such as by degrading their Uncovered property, or:

$$\text{Uncovered}[p] = \text{Uncovered}[p] \cdot \left(1 - \frac{1}{2}^d\right),$$

where d denotes their distance to $p_a$.

By way of example, an approach or algorithm suitable for implementing hierarchical clustering-type answer selection may include an example illustrated in Table 3 below. Here, similarly to a similarity-type answer selection approach discussed above, an Uncovered property of a proposition in a selected answer may be set to 0, for example, since its distance from itself is 0. Further, the more similar a proposition p to those in a selected answer, the closer its location to their locations in a clustering tree, the more p may be penalized.

TABLE 3

Example algorithm for hierarchical clustering-type answer selection.

Input: set of candidate answers A
Input: novelty assessment Uncovered
Input: all propositions AllPropositions
Input: Proposition cluster tree T
/* Choose best answer                                                   */

$$\text{bestAnswer} = \text{argmax}_{a \in A} \frac{\Sigma_{p \in A} \text{Uncovered}[p] * \text{Depth}(p, T)}{\sqrt{|a|} \cdot \left(1 + \left(1 - a \cdot \frac{\Sigma_{p \in a} \text{Uncovered}[p]}{a}\right)\right)}$$

/*   Penalize all propositions similar to those
     in the chosen answer                                               */
foreach $p_a \in$ bestAnswer do
| $n_{p_a}$ = findLeafNodeOf($p_a$, T)
| for each p $\in$ AllPropositions do
| | $n_p$ = findLeafNodeOf(p, T)
| | d =
| | distance ($n_{p_a}$, nearestCommonAncestor($n_{p_a}$, $n_p$))
| | Uncovered[p] = Uncovered[p] $\cdot \left(1 - \frac{1^d}{2}\right)$
| end
end
return best Answer Accordingly, an approach or algorithm, such as discussed herein, for ranking CQA answers may, for example, be capable of providing an on-line user with more relevant search results, which may include a number of important aspects mentioned in corresponding answers, such as for a given CQA question. As such, a user may see "the whole picture," such as by reading just a few top answers, for example, instead of viewing and/or skipping repeated suggestions and/or opinions in order to find more relevant but diverse CQA content.

In a particular simulation and/or experiment, to evaluate performances of similarity measures and/or approaches, such as discussed herein, a number of test sets and/or ranking strategies may be applied against a number of baselines. Here, for example, test sets and/or ranking strategies included aN DCG, ERR-IA, NoveltyMetric, and SupportMetric, and baselines included RandomRanker, Votes, BM25, ESA, LDARanker, PageRankRanker, SimRanker, and HCRanker, which are generally known and need not be described here in greater detail. Claimed subject matter is not limited to particular sets, ranking strategies, and/or baselines shown, of course.

The results are illustrated in Table 4 below, in which statistical significance for a difference between discussed similarity measures and/or approaches and baselines is marked by the '+' sign for p<0.05 using the Wilcoxon double-sided signed rank test. See, as an example, F. Wilcoxon. *Individual Comparisons by Ranking Methods.* Biometrics Bulletin, 1(6):80-83, 1945. It should be noted that the results in Table 4 comprise macro averages over parameters of a particular measure. Namely, α values are averaged in αNDCG metric on a range [0; 1] with jumps of 0.25, and averaged recall r values in novelty-type and support-type metrics, discussed above. For this example evaluation, 15/16 for relevant topic weight in ERR-IA was used. Of course, metrics and/or values are provided as merely examples, and claimed subject matter is not limited in this regard.

TABLE 4

Example performance results.

| Metric | αN DCG | ERR-IA | Novelty | Support |
|---|---|---|---|---|
| RandomRanker | 0.66 | 0.70 | 0.50 | 0.56 |
| Votes | 0.66 | 0.70 | 0.49 | 0.55 |
| BM25 | 0.73 | 0.77 | 0.56 | 0.65 |
| ESA | 0.72 | 0.69 | 0.57 | 0.62 |
| LDARanker | 0.71 | 0.55 | 0.54 | 0.59 |
| PageRankRanker | 0.75 | 0.78 | 0.59 | 0.66 |
| SimRanker | 0.81+ | 0.83 | 0.65+ | 0.70+ |
| HCRanker | 0.82+ | 0.85 | 0.67 | 0.72 |

Figure 2:
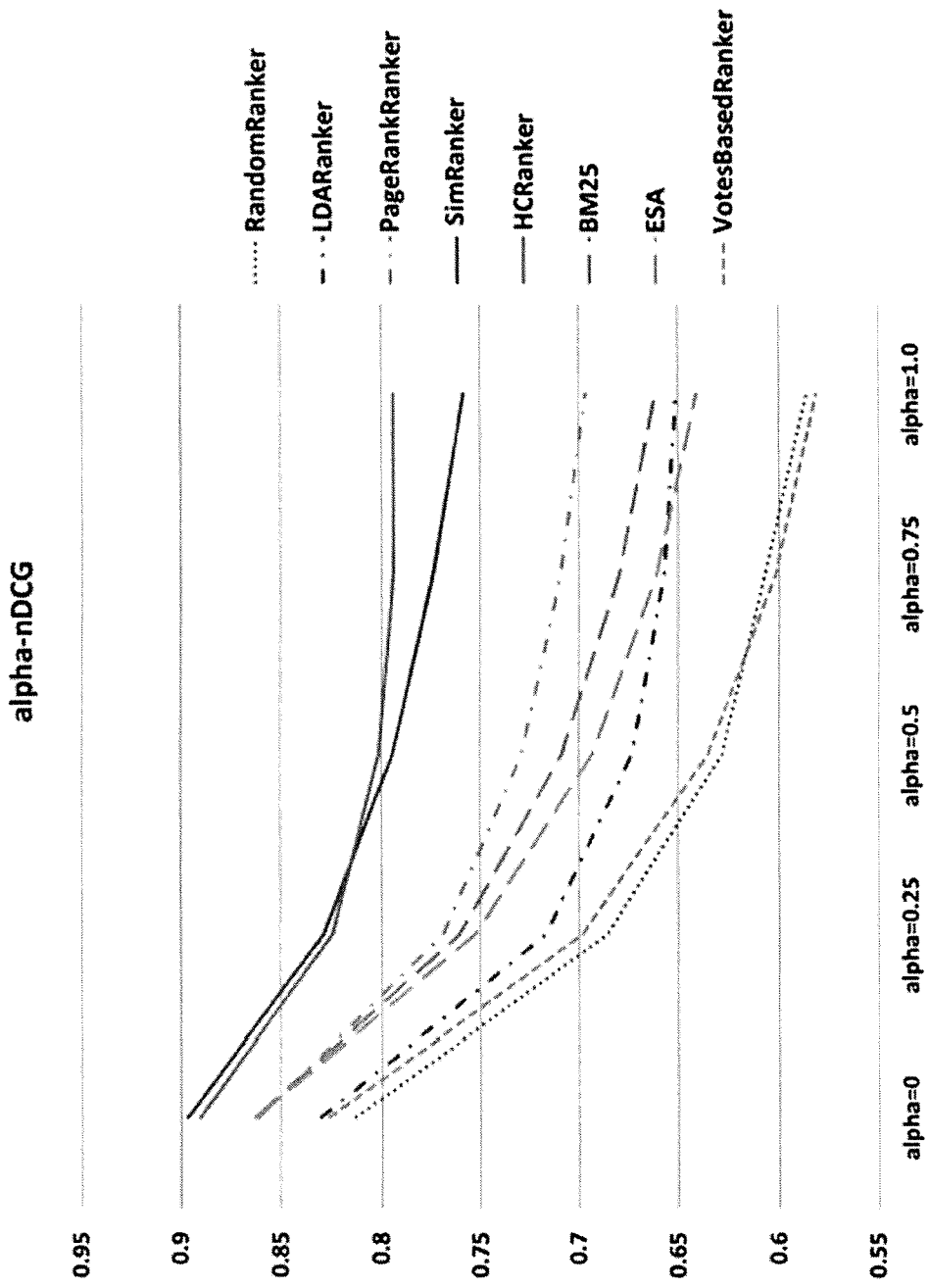
FIGS. 2-4 are graphs illustrating performances of various ranking strategies.
Figure 3:
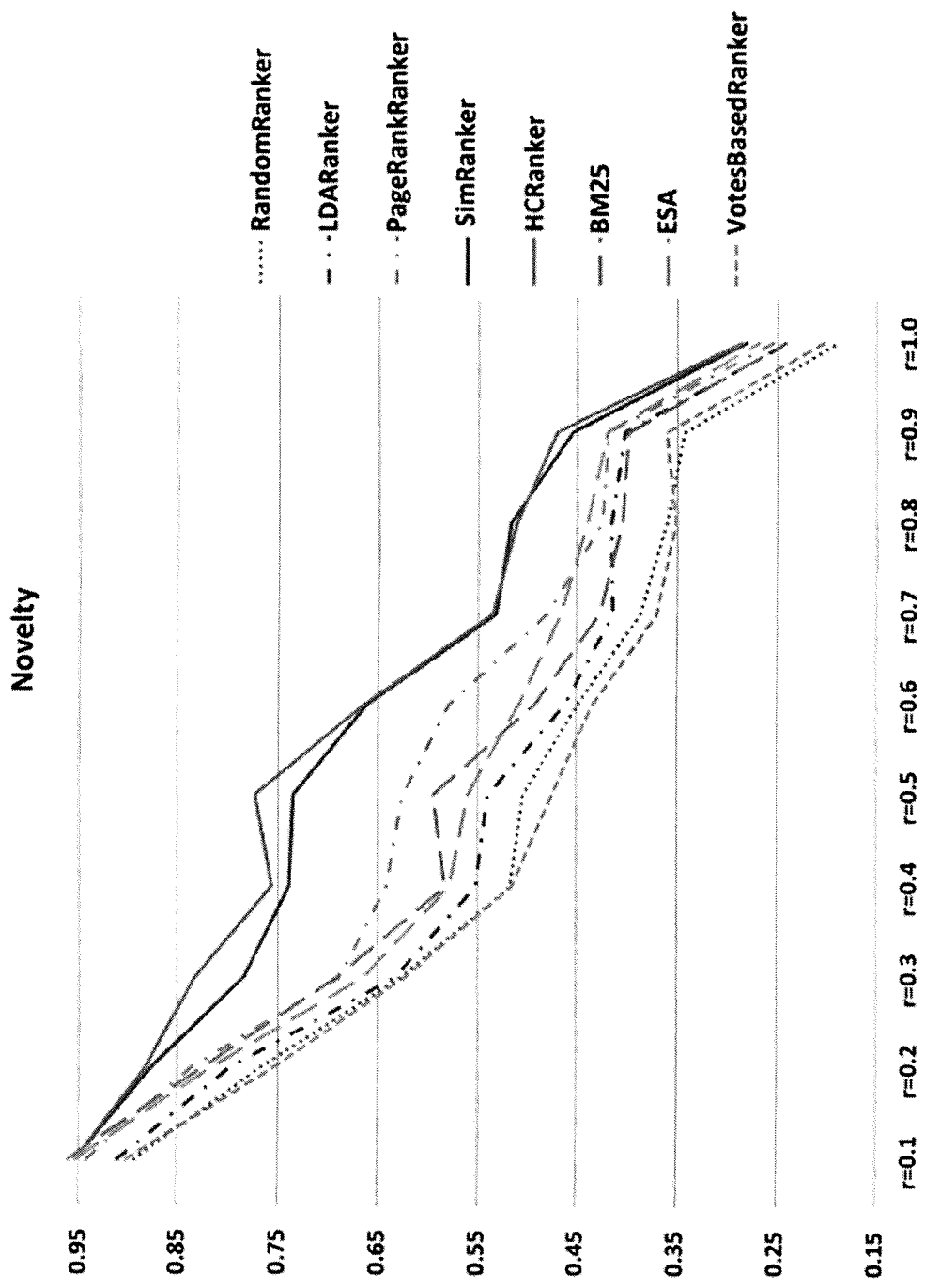
Figure 4:
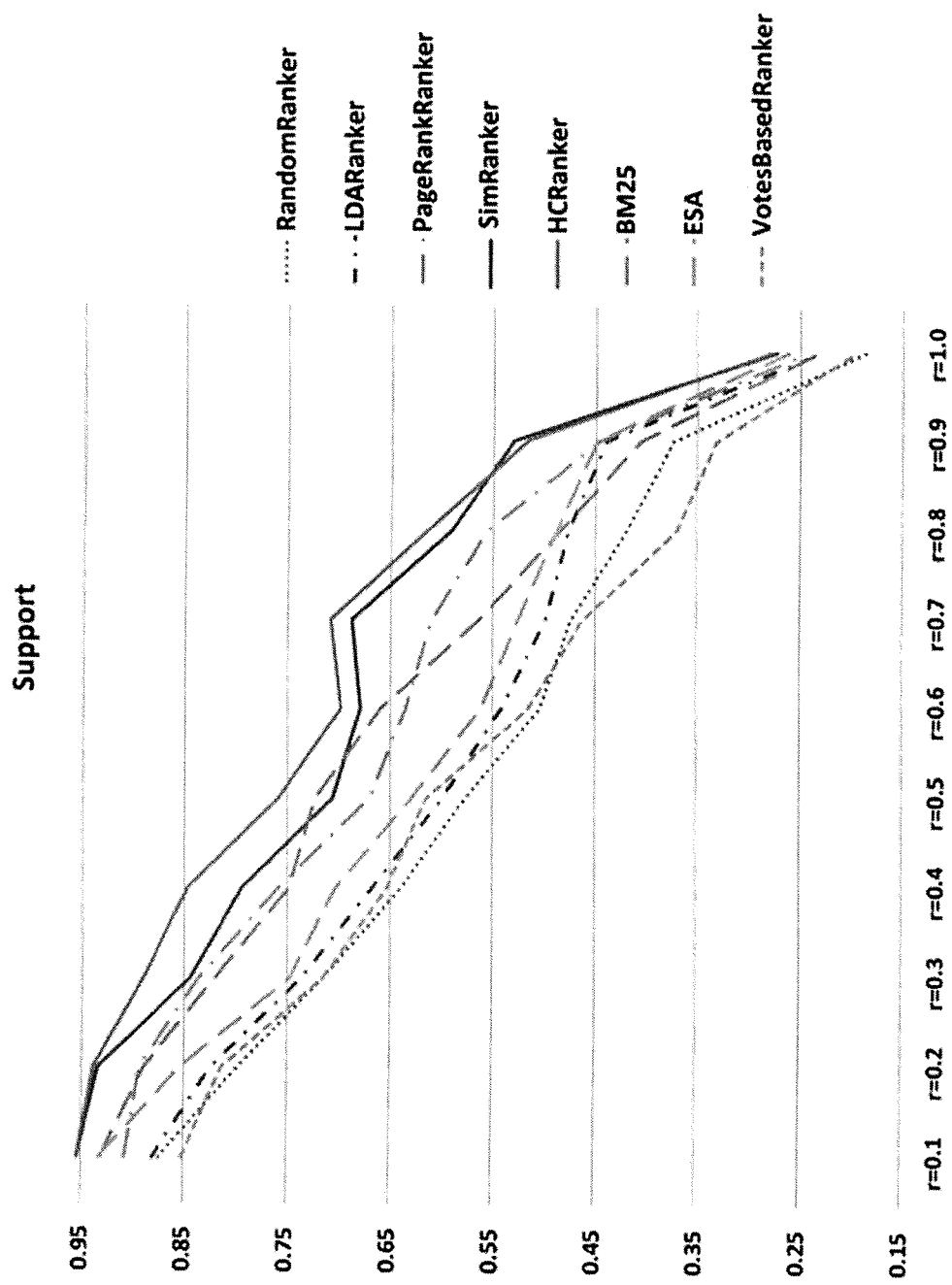

As a way of illustration, performances of similarity measures or approaches, such as discussed herein, are further shown in FIGS. 2-4, such as via aN DCG, NoveltyMetric, and SupportMetric, respectively, according to a particular simulation and/or experiment. In these example evaluation graphs, for visual convenience, similarity measures and/or approaches discussed above are plotted in solid lines, RandomRanker is plotted in dotted lines, LDARanker and PageRankRanker are plotted in mixed dashed and dots lines, and BM25, ESA and Votes baselines are plotted in dashed lines.

As seen, under a "gold standard" manual evaluation discussed above, a statistically significant improvement in performances of discussed similarity measures and/or approaches appears to be achieved. More specifically, as illustrated, these similarity measures and/or approaches performed sufficiently well and outperformed baselines under all or most parameter settings. It appears that, despite relatively conservative evaluation (e.g., with lower random baselines, more weight on novelty and diversification, etc.), the similarity measures and/or approaches introduced more diversity in the top results, for example, and proved that using a proposition-type approach may improve recognition of novel aspects in CQA answers. As also seen, even though performances of certain similarity measures or approaches is somewhat statistically closer to PageRankRanker and BM25, recall values beyond 0.6 of the ranked CQA answers for these IR or like metrics may suffer, which may indicate that using discussed similarity measures and/or approaches may prove to be beneficial with respect to covering important but infrequent aspects of CQA answers. It also appears that it may be desirable and/or beneficial to model or identify aspects at a finer-grained textual level. Again, baselines and values are provided herein as merely examples to which claimed subject matter is not limited.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 5:
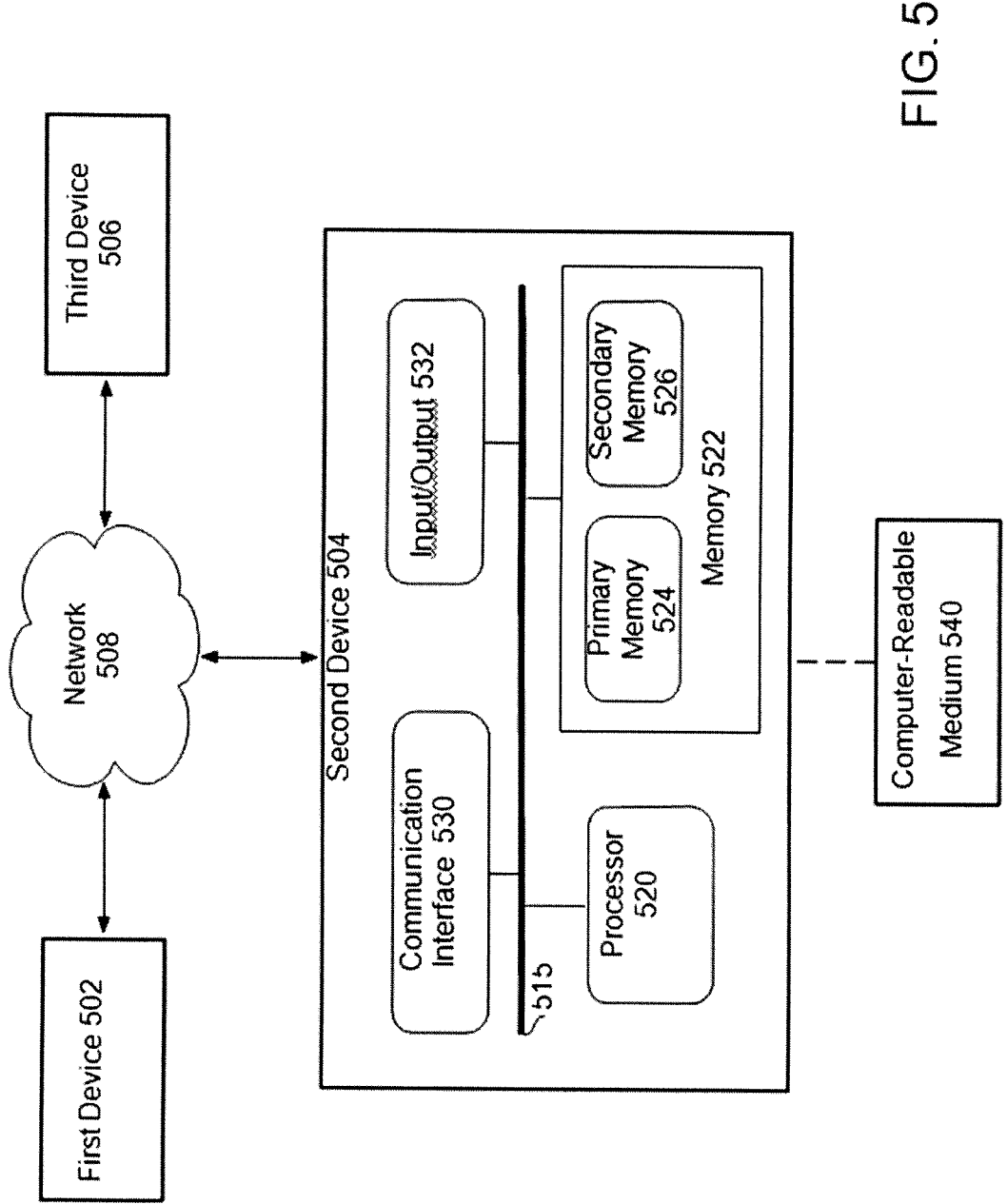
FIG. 5 is a schematic diagram illustrating an implementation of a computing device that may be employed in a client-server type interaction.

In one example embodiment, as shown in FIG. 5, a system embodiment may comprise a local network (e.g., a second device 504 and a computer-readable medium 540) and/or another type of network, such as a computing and/or communications network. For purposes of illustration, therefore, FIG. 5 shows an embodiment 500 of a system that may be employed to implement either type or both types of networks. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1, paragraphs corresponding to FIG. 1, and Tables 1 and 3 of the present disclosure.

Referring now to FIG. 5, in an embodiment, first and third devices 502 and 506 may be capable of rendering a graphical user interface (GUI) for a network device and/or a computing device, for example, so that a user-operator may engage in system use. Device 504 may potentially serve a similar function in this illustration. Likewise, in FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 515, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 504, as depicted in FIG. 5, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may be utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a device-readable medium that may carry and/or make accessible content, including code and/or instructions, for example, executable by processor 520 and/ or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   receiving, by one or more servers, a query from a client device;
   identifying, by the one or more servers, one or more candidate search results that are pertinent to the query, the one or more candidate search results including a set of community question answering (CQA) answers accessible over an electronic network;
   determining a CQA question that corresponds to the set of CQA answers;
   extracting, by the one or more servers, propositions from the set of CQA answers, each CQA answer of the set of CQA answers corresponding to at least one of the propositions, wherein the extracting comprises extracting a first proposition and a second proposition from a first CQA answer of the set of CQA answers;
   filtering, by the one or more servers, the propositions to generate filtered propositions based, at least in part, on a measure of relevance of the propositions to the CQA question corresponding to the set of CQA answers;
   measuring, by the one or more servers, similarity among the filtered propositions for the set of CQA answers identified as pertinent to the query based, at least in part, on one or more aspects identified in the filtered propositions for the set of CQA answers identified as pertinent to the query;
   ranking, by the one or more servers, the set of CQA answers based, at least in part, on the similarity, wherein the ranking comprises determining a first rank for the first CQA answer of the set of CQA answers based, at least in part, on a first similarity between the first proposition of the first CQA answer and a third proposition; and
   responsive to the query, providing, by the one or more servers, one or more search results including at least a portion of the set of CQA answers according to the ranking the set of CQA answers.

2. The method of claim 1, wherein the ranking the set of CQA answers comprises ranking the filtered propositions based, at least in part, on the similarity.

3. The method of claim 1, wherein the ranking the set of CQA answers is based, at least in part, on a greedy process.

4. The method of claim 1, comprising:
   clustering the filtered propositions for the set of CQA answers into a plurality of clusters;
   wherein at least one of the ranking the set of CQA answers or selecting the portion of the set of CQA answers is based, at least in part, on a result of clustering the filtered propositions for the set of CQA answers.

5. The method of claim 1, wherein measuring the similarity among the filtered propositions for the set of CQA answers comprises determining at least one of:
   one or more diverse aspects of the one or more aspects identified in the filtered propositions, one or more shared aspects of the one or more aspects identified in the filtered propositions, or one or more novel aspects of the one or more aspects identified in the filtered propositions, the one or more shared aspects being shared among multiple answers in the set of CQA answers.

6. The method of claim 1, wherein measuring the similarity among the filtered propositions for the set of CQA answers comprises determining shared aspects of the one or more aspects identified in the filtered propositions for the set of CQA answers, the shared aspects including at least one aspect shared between at least one of the filtered propositions of a first one of the set of CQA answers and at least one other proposition of the filtered propositions of a second one of the set of CQA answers.

7. The method of claim 1, wherein measuring the similarity among the filtered propositions for the set of CQA answers comprises measuring diversity of the filtered propositions for the set of CQA answers, wherein ranking the set of CQA answers is performed based, at least in part, on the diversity of the filtered propositions for the set of CQA answers.

8. The method of claim 1, wherein the measure of relevance comprises cosine similarity between the CQA question and the corresponding one of the set of CQA answers mapped to a shared latent space.

9. The method of claim 1, wherein the propositions are extracted using, at least in part, a dependency tree.

10. The method of claim 9, wherein the dependency tree comprises sub-trees having edges indicative of boundaries of the propositions.

11. The method of claim 1, wherein the set of CQA answers is relevant to the CQA question.

12. The method of claim 1, wherein the filtering the propositions is based, at least in part, on ranking the propositions via an Explicit Semantic Analysis (ESA)-CQA approach.

13. The method of claim 1, wherein the similarity among the filtered propositions is measured based, at least in part, on one or more unsupervised similarity measures.

14. The method of claim 1, wherein the extracting comprises extracting a third proposition and a fourth proposition from a second CQA answer of the set of CQA answers.

15. An apparatus comprising:
   at least one computing device, the at least one computing device including at least one processor and at least one memory;
   the at least one processor being configured to:
   process a query received from a client device;
   identify one or more candidate search results that are pertinent to the query, the one or more candidate search results including a set of community question answering (CQA) answers accessible over an electronic network;

determine a CQA question that corresponds to the set of CQA answers;

extract propositions from the set of CQA answers, each CQA answer of the set of CQA answers corresponding to at least one of the propositions, wherein the extracting comprises extracting a first proposition and a second proposition from a first CQA answer of the set of CQA answers;

filter the propositions to generate filtered propositions based, at least in part, on a measure of relevance of the propositions to the CQA question that corresponds to the set of CQA answers;

measure similarity among the filtered propositions for the set of CQA answers identified as pertinent to the query based, at least in part, on one or more aspects identified in the filtered propositions for the set of CQA answers identified as pertinent to the query;

rank the set of CQA answers based, at least in part, on the similarity; and responsive to the query, provide one or more search results including at least a portion of the set of CQA answers according to the ranking.

16. The apparatus of claim 15, at least one of the at least one processor or the at least one memory being configured to rank the filtered propositions based, at least in part, on the similarity.

17. The apparatus of claim 15, the similarity indicating at least one of:
one or more diverse aspects of the one or more aspects;
one or more shared aspects of the one or more aspects, the one or more shared aspects being shared among multiple answers in the set of CQA answers; or
one or more novel aspects of the one or more aspects; or any combination thereof.

18. The apparatus of claim 15, at least one of the at least one processor or the at least one memory being configured to use the similarity to measure importance of the filtered propositions.

19. The apparatus of claim 15, at least one of the at least one processor or the at least one memory being configured to use the similarity to measure diversity of the filtered propositions for the set of CQA answers, wherein ranking the set of CQA answers is performed based, at least in part, on the diversity of the filtered propositions for the set of CQA answers.

20. A computer program product comprising one or more non-transitory computer-readable media having computer program instructions stored therein, the computer program instructions being configured such that, when executed by one or more computing devices, the computer program instructions cause the one or more computing devices to:

process a query received from a client device;

identify one or more candidate search results that are pertinent to the query, the one or more candidate search results including a set of community question answering (CQA) answers accessible over an electronic network;

determine a CQA question that corresponds to the set of CQA answers;

extract propositions from the set of CQA answers, each CQA answer of the set of CQA answers corresponding to at least one of the propositions, wherein the extracting comprises extracting a first proposition and a second proposition from a first CQA answer of the set of CQA answers;

filter the propositions to generate filtered propositions based, at least in part, on a measure of relevance of the propositions to the CQA question that corresponds to the set of CQA answers;

measure similarity among the filtered propositions for the set of CQA answers identified as pertinent to the query based, at least in part, on one or more aspects identified in the filtered propositions for the set of CQA answers identified as pertinent to the query;

rank the set of CQA answers based, at least in part, on the similarity, wherein the ranking comprises determining a first rank for the first CQA answer of the set of CQA answers based, at least in part, on a first similarity between the first proposition of the first CQA answer and one or more propositions; and responsive to the query, provide one or more search results including at least a portion of the set of CQA answers according to the ranking the set of CQA answers.

21. The computer program product of claim 20, wherein the computer program instructions cause the one or more computing devices to:

rank the filtered propositions based, at least in part, on the similarity.

* * * * *